United States Patent
Harned et al.

(10) Patent No.: US 8,858,660 B2
(45) Date of Patent: Oct. 14, 2014

(54) COOLED GASIFIER VESSEL THROAT PLUG WITH INSTRUMENTATION CAVITY

(75) Inventors: Monty Lee Harned, Sugar Land, TX (US); Aaron John Avagliano, Houston, TX (US); Shashishekara Sitharamarao Talya, Houston, TX (US); Kevin Michael Sullivan, Houston, TX (US)

(73) Assignee: General Electric Company, Schenectady, NY (US)

( * ) Notice: Subject to any disclaimer, the term of this patent is extended or adjusted under 35 U.S.C. 154(b) by 1008 days.

(21) Appl. No.: 12/353,346

(22) Filed: Jan. 14, 2009

(65) Prior Publication Data

US 2010/0175321 A1 Jul. 15, 2010

(51) Int. Cl.
*B01J 7/00* (2006.01)
*F23D 14/78* (2006.01)
*C10J 3/50* (2006.01)
*C10K 1/00* (2006.01)
*C10J 3/76* (2006.01)
*F01K 23/06* (2006.01)

(52) U.S. Cl.
CPC ......... *F23D 14/78* (2013.01); *C10J 2300/1653* (2013.01); *C10K 1/005* (2013.01); *C10J 3/76* (2013.01); *Y02E 20/18* (2013.01); *C10J 2300/1678* (2013.01); *C10J 2300/0959* (2013.01); *F01K 23/067* (2013.01); *C10J 3/506* (2013.01); *C10J 2300/0983* (2013.01); *Y02E 20/16* (2013.01); *C10J 2300/0976* (2013.01)
USPC .......................................................... 48/61

(58) Field of Classification Search
CPC ....... F16K 5/04; F16K 5/0407; F16K 5/0414; F16K 5/0421; F16K 5/0428; F16K 5/0435; F16K 5/0442; F16K 5/045; F16K 5/0457; F16K 5/0464; F16K 5/0471; F16K 5/0478; F16K 5/0485; F16K 5/0492
USPC ........................................ 48/61–118.5, 127.9
See application file for complete search history.

(56) References Cited

U.S. PATENT DOCUMENTS

| | | | | |
|---|---|---|---|---|
| 3,980,422 A | * | 9/1976 | Dennis | 431/116 |
| 5,101,659 A | * | 4/1992 | Takeuchi | 73/114.19 |
| 5,372,618 A | | 12/1994 | Andrus, Jr. | |
| 5,706,851 A | * | 1/1998 | Lopez-Gomez et al. | 137/246.22 |
| 5,785,721 A | * | 7/1998 | Brooker | 48/86 R |
| 5,960,026 A | * | 9/1999 | Nolting et al. | 373/24 |
| 6,276,611 B1 | * | 8/2001 | Brooker et al. | 239/5 |
| 6,827,912 B2 | | 12/2004 | Schingnitz et al. | |
| 2003/0196576 A1 | * | 10/2003 | Whittaker et al. | 110/260 |
| 2006/0231645 A1 | * | 10/2006 | Chan | 239/424 |
| 2006/0242907 A1 | | 11/2006 | Sprouse et al. | |
| 2008/0086945 A1 | | 4/2008 | Wunning | |

FOREIGN PATENT DOCUMENTS

EP 2006357 A1 12/2008
JP 2122106 A 5/1990

OTHER PUBLICATIONS

International Search Report and Written Opinion for PCT Application No. PCT/US2009/068936, dated Dec. 14, 2011, pp. 1-11.

\* cited by examiner

*Primary Examiner* — Imran Akram
(74) *Attorney, Agent, or Firm* — Cantor Colburn LLP (57) ABSTRACT

A throat plug for a gasifier vessel includes at least one first cavity being receptive to at least one device located in the at least one first cavity, and at least one second cavity being receptive to a fuel injector.

8 Claims, 6 Drawing Sheets

COOLED GASIFIER VESSEL THROAT PLUG WITH INSTRUMENTATION CAVITY

BACKGROUND OF THE INVENTION

The subject matter disclosed herein relates to the gasification of materials, and, in particular, to a cooled throat plug for a gasifier vessel, the throat plug including an instrumentation cavity.

Gasification is a partial oxidation process that converts carbonaceous materials, such as coal, petroleum, or biomass, into carbon monoxide and hydrogen by reacting the raw material at high temperatures with a controlled amount of oxygen and/or steam. The resulting gas mixture is called synthesis gas or "syngas", which itself is a fuel. Gasification is a relatively efficient method for extracting energy from many different types of organic materials, and also has application as a clean waste disposal technique.

An advantage of gasification is that use of the syngas is relatively more efficient than direct combustion of the original fuel. As a result, more of the energy contained in the fuel is extracted. Syngas may be burned directly in internal combustion engines, used to produce methanol and hydrogen, or converted via the Fischer-Tropsch process into synthetic fuel. Gasification can also begin with materials that are not otherwise useful fuels, such as biomass or organic waste. In addition, the high-temperature combustion refines out corrosive ash elements such as chloride and potassium, allowing clean gas production from otherwise problematic fuels.

Gasification of fossil fuels is currently widely used in electricity generation. For example, the syngas can be cleaned and then sent to a gas turbine/steam turbine combined cycle system where it is used to generate electricity. Pollution causing emissions are captured and cost effectively removed from the syngas stream before combustion. Thus, the overall system converts, e.g., coal into a cleaner burning fuel for generation of electricity therefrom. Such an overall system is oftentimes referred to as an integrated gasification combined cycle (IGCC) system.

Almost any type of organic material can be used as the raw material for gasification, such as wood, biomass, or even plastic waste. Thus, gasification may be an important technology for renewable energy. In particular biomass gasification can be carbon neutral.

Gasification of fossil fuels typically takes place in a chamber or refractory vessel called a gasifier vessel, which commonly is an internally coated metal stricture. Gasifier vessel floors typically include an inverted frusto-conical throat to allow synthesis gas to flow out of the gasifier vessel. A metal gasifier floor supports refractory material, such as a ceramic brick, that covers the metal floor and also supports the refractory material that covers the inner surface of the gasifier vessel.

Instrumentation in a gasifier vessel is typically limited to thermocouples and skin temperature sensing devices due to the inability to access the internal process (i.e., conversion of coal to syngas) taking place within the gasifier vessel. The internal process operates at relatively high temperature and pressure in a corrosive environment, thereby making it difficult to insert typical sensor arrays into the vessel. Instrumentation has traditionally been inserted through the brick refractory on the side of the vessel, and in general has been limited to thermocouples. Other methods of temperature sensing have been used industry wide to gather surface temperatures of gasifier vessels.

Injection of various fuels, and streams of foreign material into the gasifier vessel usually requires a separate piece of equipment for natural gas burners, or injection of tracer streams in the slurry line considerably upstream of the injector. Point of operation injection is difficult to conduct. For injection, it is industry practice to swap injector devices. For example, a plant will have an injector for natural gas for bringing the refractory brick up to temperature and an injector for the injection of the fuel to create syngas.

BRIEF DESCRIPTION OF THE INVENTION

According to one aspect of the invention, a throat plug for a gasifier vessel includes at least one first cavity being receptive to at least one device located in the at least one first cavity, and at least one second cavity being receptive to a fuel injector.

According to another aspect of the invention, a plug includes a first cavity, the first cavity being configured to hold at least one device in the first cavity, the first cavity being accessible through a hole formed in the plug. The plug also includes a second cavity, the second cavity being configured to hold a fuel injector that passes fuel feed material through the fuel injector.

According to yet another aspect of the invention, a throat plug for a gasifier vessel includes a first cavity, the first cavity being configured to hold at least one device in the first cavity, the first cavity being accessible through a hole formed in the throat plug. The throat plug includes a second cavity, the second cavity being nested within the first cavity, the second cavity being configured to hold a fuel injector. The throat plug also includes a third cavity that surrounds the first cavity, the third cavity circulating a coolant through the third cavity to cool a temperature of the first cavity.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
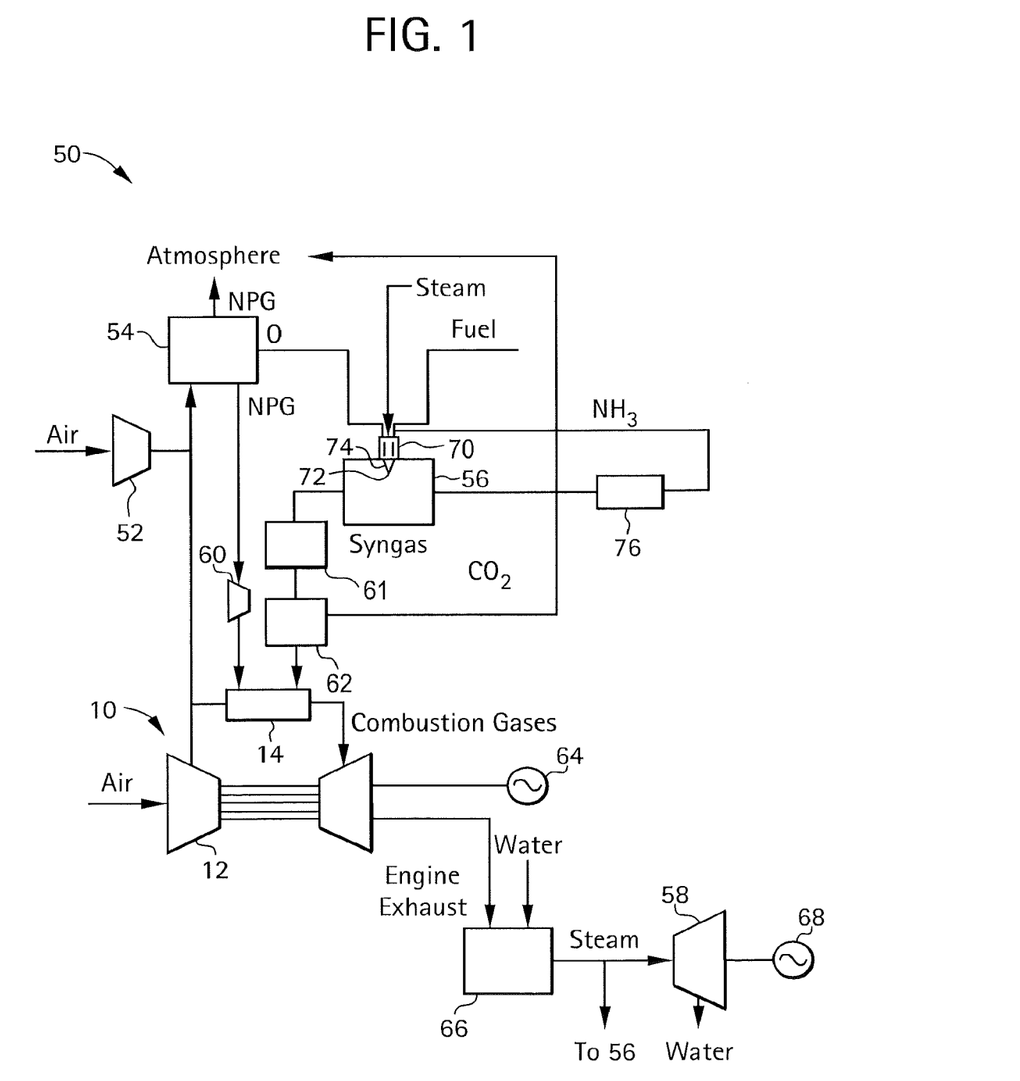
FIG. 1 is a block diagram of an exemplary embodiment of an integrated gasification combined cycle (IGCC) power generation system.

Referring to FIG. 1, an embodiment of an integrated gasification combined cycle (IGCC) power generation system 50 generally includes a main air compressor 52, an air separation unit 54 coupled in flow communication with compressor 52, a gasifier 56 coupled in flow communication with air separation unit 54, a gas turbine engine 10 coupled in flow communication with gasifier 56, and a steam turbine 58.

In operation, compressor 52 compresses ambient air. The compressed air is channeled to air separation unit 54. In some embodiments, in addition or alternative to compressor 52, compressed air from gas turbine engine compressor 12 is supplied to air separation unit 54. Air separation unit 54 uses the compressed air to generate oxygen for use by gasifier 56. More specifically, air separation unit 54 separates the compressed air into separate flows of oxygen and a gas by-product, sometimes referred to as a "process gas". The process gas generated by air separation unit 54 includes nitrogen and is referred to as "nitrogen process gas". The nitrogen process gas may also include other gases such as, but not limited to, oxygen and/or argon. For example, in some embodiments, the nitrogen process gas includes between approximately 95% and 100% nitrogen. The oxygen flow is channeled to gasifier 56 for use in generating partially combusted gases, referred to as "syngas" for use by gas turbine engine 10 as fuel. In some known IGCC systems 50, at least some of the nitrogen process gas flow, a by-product of air separation unit 54, is vented to the atmosphere. Moreover, in some known IGCC systems 50, some of the nitrogen process gas flow is injected into a combustion zone (not shown) within gas turbine engine combustor 14 to facilitate controlling emissions of engine 10, and more specifically to facilitate reducing the combustion temperature and reducing nitrous oxide emissions from engine 10. IGCC system 50 may include a compressor 60 for compressing the nitrogen process gas flow before being injected into the combustion zone.

Gasifier 56 converts a mixture of fuel, the oxygen supplied by air separation unit 54, steam, and/or limestone into an output of syngas for use by gas turbine engine 10 as fuel. Although gasifier 56 may use any fuel, in some known IGCC systems 50, gasifier uses coal, petroleum coke, residual oil, oil emulsions, tar sands, and/or other similar fuels. In some known IGCC systems 50, the syngas generated by gasifier 56 include carbon dioxide. The syngas generated by gasifier 56 is then passed through heat exchanger 61, which may be of a radiant or convective design and is used to cool the syngas that exits the gasifier 56. The cooled syngas may be cleaned in a cleanup device 62 before being channeled to gas turbine engine combustor 14 for combustion thereof. Carbon dioxide may be separated from the syngas during cleanup and, in some known IGCC systems 50, vented to the atmosphere. The power output from gas turbine engine 10 drives a generator 64 that supplies electrical power to a power grid (not shown). Exhaust gas from gas turbine engine 10 is supplied to a heat recovery steam generator 66 that generates steam for driving steam turbine 58. Power generated by steam turbine 58 drives an electrical generator 68 that provides electrical power to the power grid. In some known IGCC systems 50, steam from heat recovery steam generator 66 is supplied to gasifier 56 for generating the syngas.

In an exemplary embodiment of the IGCC system 50, gasifier 56 may include an injection nozzle 70 extending through gasifier 56. Injection nozzle 70 may include a nozzle tip 72 at a distal end 74 of injection nozzle 70. In an exemplary embodiment, injection nozzle 70 may be configured to direct a stream of ammonia proximate nozzle tip 72 such that the stream of ammonia facilitates reducing a temperature of at least a portion of nozzle tip 72. In an exemplary embodiment, IGCC system 50 includes a syngas condensate stripper 76 configured to receive condensate from a stream of syngas discharged from gasifier 56.

Figure 2:
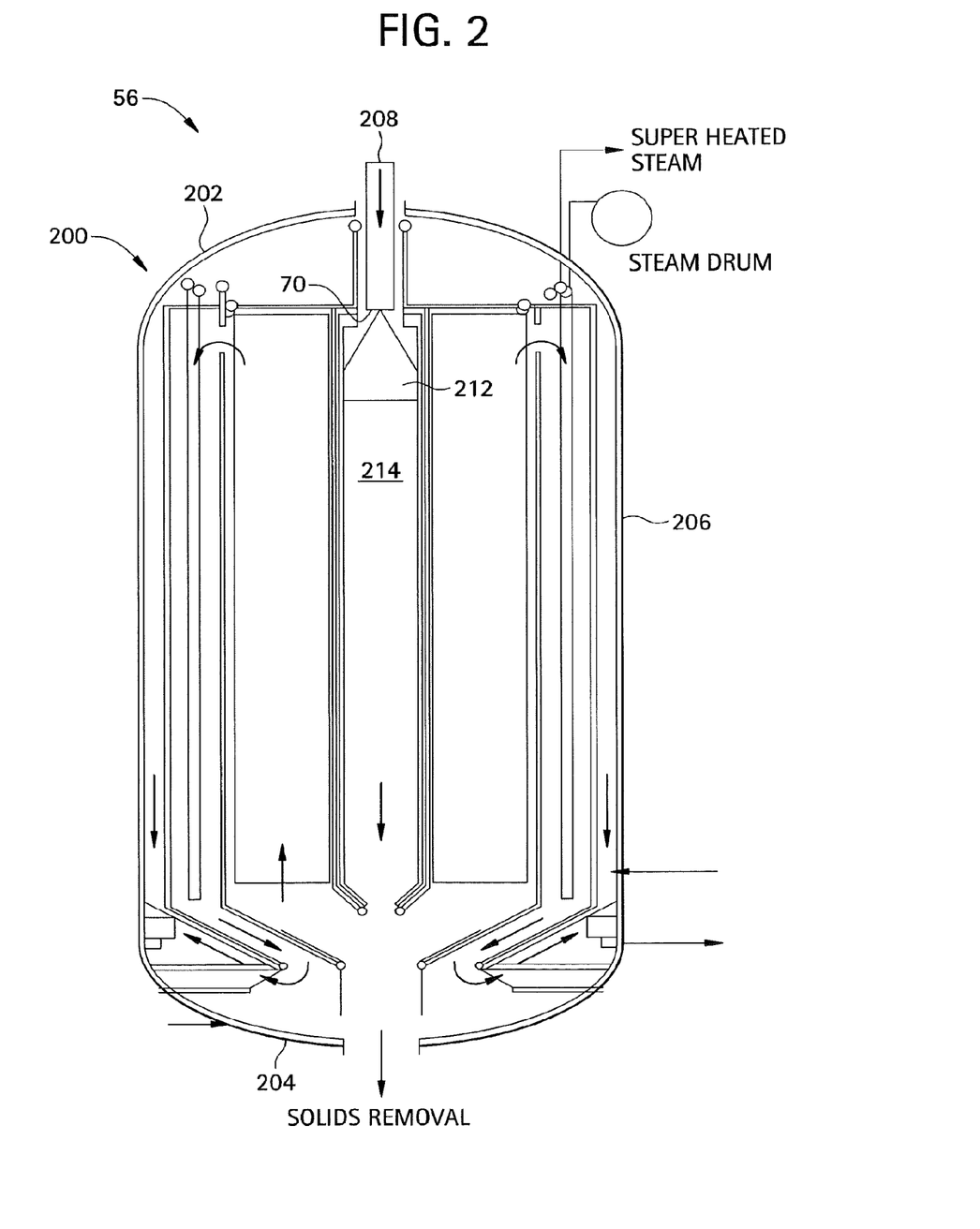
FIG. 2 is a schematic view of an exemplary embodiment of an advanced solids removal gasifier vessel that may be used with the IGCC system of FIG. 1.

Referring to FIG. 2, an exemplary embodiment of an advanced solids removal gasifier 56 that may be used with the IGCC system 50 of FIG. 1 includes the gasifier 56 embodied as a vessel 200 having an upper shell 202, a lower shell 204, and a substantially cylindrical vessel body 206 extending therebetween. A fuel injector 208 penetrates upper shell 202 to enable a flow of fuel to be channeled into gasifier 56. Fuel injector 208 includes the fuel injection nozzle 70 that discharges the fuel in a predetermined pattern 212 into a combustion zone 214 defined in gasifier 56. Fuel may flow through one or more passages (not shown in FIG. 2) defined in fuel injector 208 and exits fuel injector 208 through nozzle 70. The fuel may be mixed with other substances prior to entering nozzle 70, and/or may be mixed with other substances after being discharged from nozzle 70. For example, the fuel may be mixed with fines recovered from a process of IGCC system 50 prior to entering nozzle 70, and/or the fuel may be mixed with an oxidant, such as air or oxygen, at nozzle 70 or downstream from nozzle 70.

Figure 3:
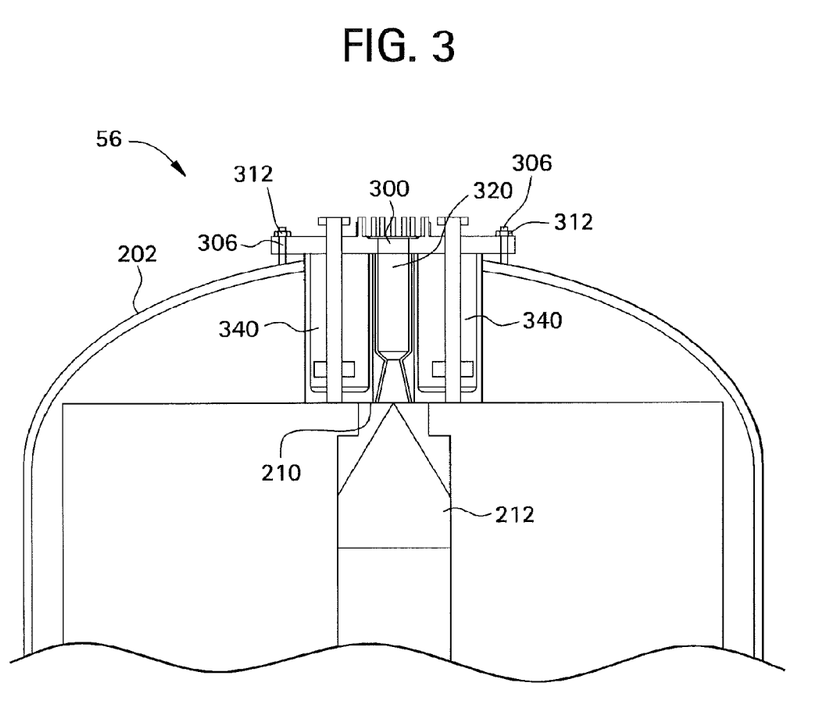
FIG. 3 is a more detailed view of a portion of the gasifier vessel of FIG. 2 with an embodiment of the throat plug of the present invention mounted therein.

FIG. 3 is a more detailed view of an upper portion of the gasifier vessel 200 of FIG. 2 with a throat plug 300 according to an embodiment of the invention mounted therein. The throat plug 300 is also illustrated in more detail in FIGS. 4-7, including with a fuel injector 324 mounted to the throat plug 300. That is, the fuel injector 324 is not shown in FIG. 3. Referring also to FIGS. 4-7, the throat plug 300 is cylindrical in shape and is mounted or fitted into the existing, typically cylindrical opening in the neck or dome portion of the upper shell 202 of the gasifier vessel 200. However, it is to be understood that the shape of the throat plug 300 is not limited to cylindrical and can take on any other shape. Typically the shape of the throat plug 300 is the same as that of the opening in the upper shell 202 of the gasifier vessel 200. The opening in the neck portion of the upper shell of conventional gasifier vessels 200 may need to be widened to accommodate what may be a larger diameter size of the throat plug 300. That is, the diameter of the throat plug cylinder may be wider than the cylindrical opening in the upper neck or dome portion of the upper shell 202. Such widening may be achieved, for example, by removing some of the refractory bricks that are typically located in the upper neck portion of upper shell 202 (i.e., "brick in throat"). The throat plug 300 may comprise a cobalt- or nickel-based alloy, or other suitable material.

As shown in FIG. 3, in an exemplary embodiment the throat plug 300 mounts to the upper shell 202 of the gasifier vessel 200 by way of bolts 306 that protrude up from an upper surface of the upper shell 202. The bolts 306 pass through corresponding holes 308 formed around an outer periphery of a flange 310 that is at the top of the throat plug 300. A corresponding nut 312 is threaded on each bolt 306 to thereby secure the throat plug 300 to the gasifier vessel 200.

Figure 4:
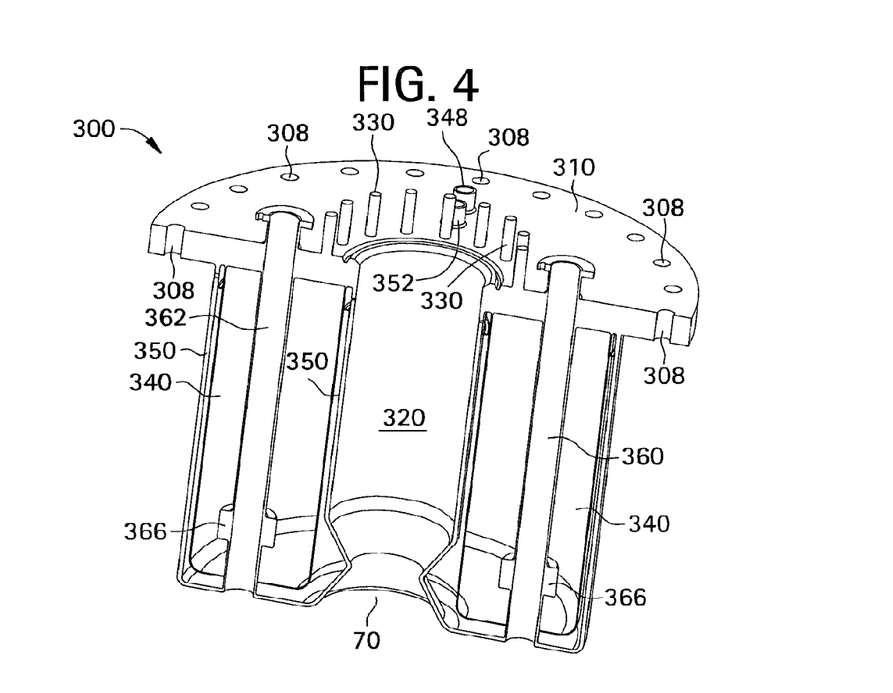
FIG. 4 is a cutaway view of the throat plug of FIG. 3 in accordance with an embodiment of the invention.

As best seen in FIG. 4, in an embodiment the throat plug 300 includes a centrally located cylindrical opening or cavity 320 into which may be placed a fuel injector 324. The injector 324 is used to feed fuel material into the gasifier vessel 200 for gasification thereof, as described in detail hereinabove with respect to the IGCC system 50 of FIG. 1. In an embodiment, an upper portion of the fuel injector 324 may comprise a flange 326 that sits on a top surface of the flange 310 of the throat plug 300. A plurality of bolts 330 protrude up from the top surface of the flange 310 of the throat plug 300 and the bolts 330 pass through corresponding holes formed in the flange 326 of the fuel injector 324. Nuts threaded onto the bolts 330 may then be used to secure the fuel injector 324 to the throat plug 300. A gasket 334 that may comprise, e.g., a rubber o-ring, may be utilized to help seal the fuel injector 324 to the throat plug 300. The entire load of the fuel injector 324 may be placed on the gasket 334.

Figure 7:
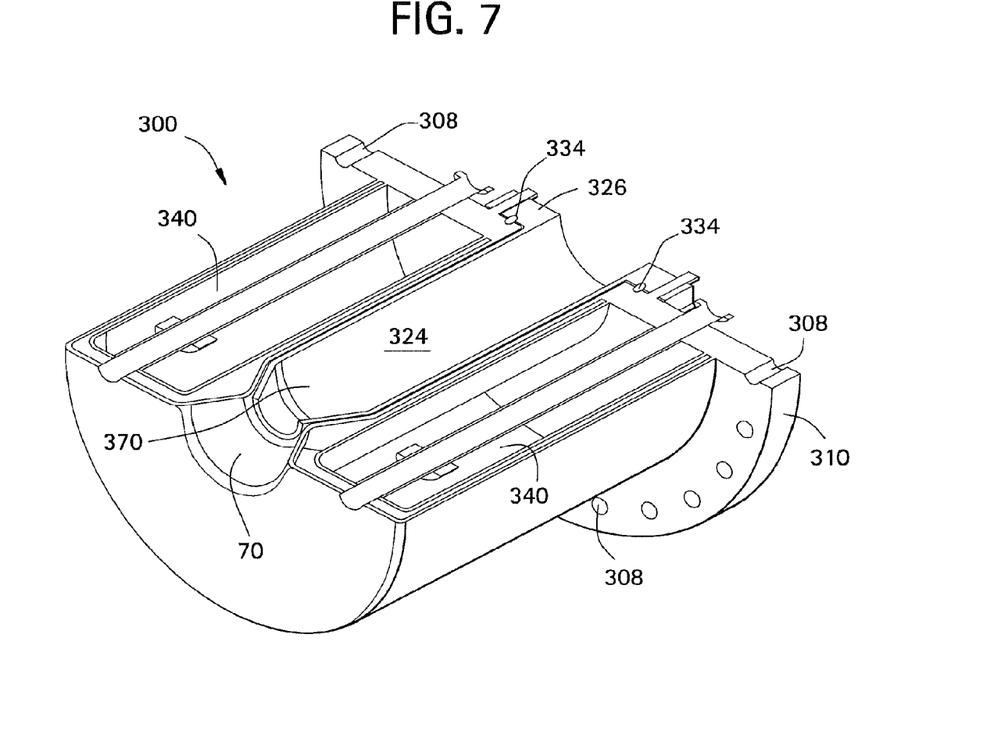
FIG. 7 is another cross section view of the throat plug of FIGS. 3-6 in accordance with an embodiment of the invention.

As best seen in FIGS. 3, 4 and 7, the throat plug 300 of an embodiment of the invention includes a continuous, outer internal cavity 340 that encircles the central cylindrical opening 320 that accommodates the fuel injector 324. That is, the opening 320 is nested within the outer internal cavity 340. In accordance with an embodiment of the invention, the outer cavity 340 is configured to have various types of instrumentation (not shown) installed within the cavity 340. The instrumentation that may be inserted within the cavity 340 may include, without limitation, all or a part of (depending on size) cameras, pressure sensors, thermocouples, gas sampling devices, optical pyrometers, laser spectrometers, etc. The instrumentation can be used to gather accurate data with respect to various characteristics of the fuel injector 324 and/or the gasifier vessel 200 during operation thereof. These characteristics include, without limitation, reaction operation, spray patterns and gas composition at the point of reaction, and the data may be gathered in real time. This data may be used for active control of the fuel feed material, and potentially the atomization with an appropriate annulus control device. Thus, the cavity 340 that is part of the throat plug 300 of embodiments of the invention create a relatively sizeable area for the installation of various types of instrumentation that has not been able to be installed and utilized previously with a typical gasifier vessel 200. Further, the throat plug 300 may enable use of an active clearance control such that when used with a variable annulus injector, the injector performance can be improved for a chosen throughput.

Figure 5:
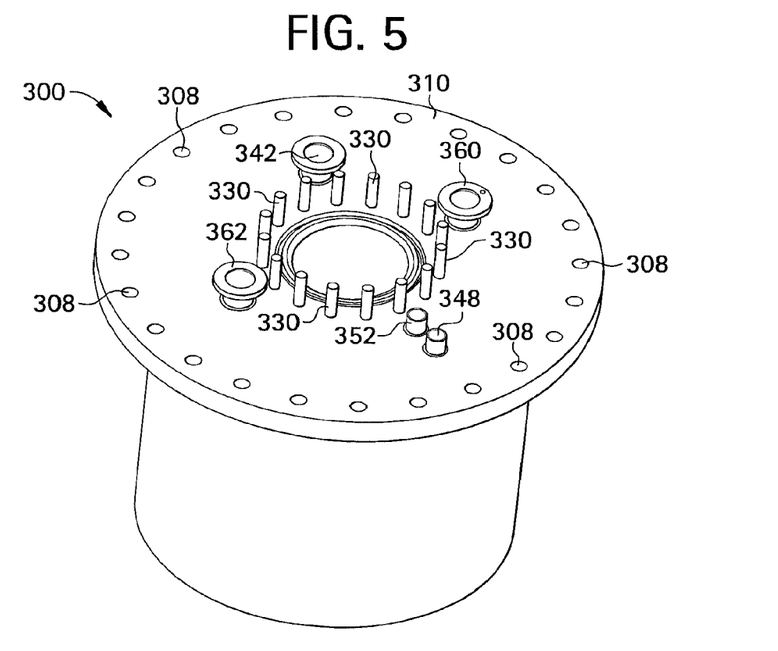
FIG. 5 is a perspective view of the throat plug of FIGS. 3-4 in accordance with an embodiment of the invention.
Figure 6:
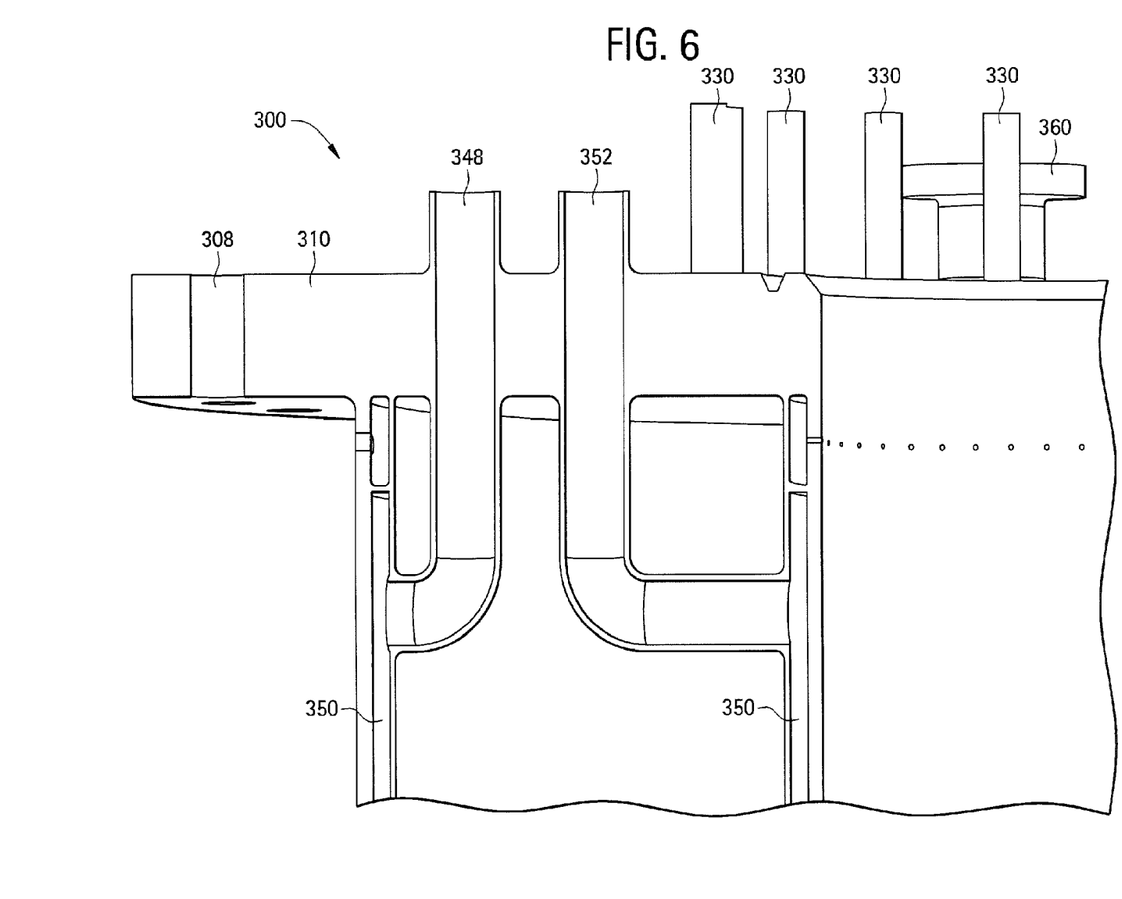
FIG. 6 is a cross section view, partially cutaway, of a portion of the throat plug of FIGS. 3-5 in accordance with an embodiment of the invention.

In accordance with an embodiment of the invention, the instrumentation may be inserted into the cavity 340 through a flanged porthole 342 (FIG. 5) formed in the top surface of the flange 310 of the throat plug 300. The cavity 340 inherently protects the instrumentation located within the cavity 340 from any harmful or corrosive effects inherent in the environment that the throat plug 300 is utilized in. In addition, in an embodiment the cavity 340 is further protected from the typically elevated temperatures encountered by the throat plug 300 through use of cooling of the cavity 340 to reduce the temperature of the cavity 340. Referring to FIGS. 4-6, cooling of the cavity 340 is achieved in an embodiment by a closed loop system in which a gaseous or liquid coolant material, such as water, is introduced into a piped opening 348 in the top surface of the flange 310 of the throat plug 300. The cooling water then proceeds to pass through a relatively narrow cavity 350 that surrounds the entire cavity 340 in which the instrumentation is located. The water then exits the cavity 350 through a second piped opening 352 in the top surface of the flange 310 of the throat plug 300. In an embodiment of the invention, the coolant water temperature may be in the range of 110-120 degrees Fahrenheit, and the pressure of the water may be approximately 600 psi. Further, the water may be treated with various corrosive inhibitors, and a carbon monoxide monitor (not shown) may be located at or near the return piped opening 352 to detect any leaks in the water fooling system.

Referring to FIGS. 4-5, in an embodiment a pair of tubes or pipes 360, 362 are provided, wherein the tubes 360, 362 each have a flanged opening on the top surface of the flange 310 of the throat plug 300. The tubes 360, 362 then pass entirely through the cavity 340 and each tube has a corresponding opening at the bottom of the throat plug 300. Thus, when the throat plug 300 is attached to the gasifier vessel 200, the tubes 360, 362 are configured to pass or inject various items, such as radioactive dies, e.g., for tracing, or preheating fuels, through the throat plug 200 and into the gasifier vessel 200. The tubes 360, 362 may also allow for gas sampling from the gasifier vessel 200. As such, the tubes 360, 362 function as permanent injection ports, which allow for, e.g., reduced maintenance cycles and ease of implementation of tracer materials, as needed. The flanged opening for each tube 360, 362 allows for a relatively good seal to be made to the equipment that interfaces with the openings. Also, a servo 366 (FIG. 4) may be provided for each tube 360, 362, wherein the servo functions to provide a gas tight seal.

Referring to FIG. 7, in an embodiment the fuel injector 324 has a relatively constant diameter starting at the top of the injector near the flange 310 of the throat plug 300 and proceeding downward. However, the bottom end 370 of the injector 324 narrows downward in diameter. Then, beyond the bottom end 370 of the injector 324, the throat plug flares outward in diameter into the nozzle area 70, similar to a diffuser, thereby allowing for the natural expansion of injected materials passing through the injector 324 and into the gasifier vessel 200.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A throat plug for a gasifier vessel, the throat plug comprising:
   a first cavity, the first cavity being configured to hold at least one device in the first cavity, the first cavity being accessible through a hole formed in the throat plug;
   a second cavity, the second cavity being nested within the first cavity, the second cavity being configured to hold a fuel injector; and
   a third cavity that surrounds the first cavity along an outer radial surface of the first cavity and along an inner radial surface of the first cavity opposite the outer radial surface, the third cavity configured to circulate a coolant through the third cavity to cool a temperature of the first cavity.

2. The throat plug of claim 1, further comprising:
   at least one tube that extends through an entire length of the first cavity and is sealed off from an inside of the first cavity.

3. The throat plug of claim 2, the at least one tube having an opening at each end of the throat plug.

4. The throat plug of claim 1, further comprising:
   a first opening in the throat plug to introduce the coolant into the third cavity; and
   a second opening in the throat plug to facilitate the exit of the coolant from the third cavity.

5. The throat plug of claim 1, further comprising:
   a flange located at an outside end of the first cavity, the second cavity, and the third cavity; and
   a gasket configured to be located between the flange of the throat plug and a flange of the fuel injector.

6. The throat plug of claim 1, the throat plug being cylindrical in shape, the at least one first cavity and the at least one second cavity being cylindrical in shape.

7. The throat plug of claim 6, the at least one first cavity encircling the at least one second cavity.

8. The throat plug of claim 1, wherein the throat plug comprises one of a cobalt- and a nickel-based alloy.

* * * * *